United States Patent [19]

Yamade

[11] 3,755,081

[45] Aug. 28, 1973

[54] PROCESS FOR PREPARING L-SERINE

[75] Inventor: Hideaki Yamade, Kyoto, Japan

[73] Assignee: Kyowa Hakko Kogyo Kabushiki Kaisha, Tokyo-to, Japan

[22] Filed: Feb. 19, 1971

[21] Appl. No.: 117,124

[30] Foreign Application Priority Data
May 6, 1970   Japan................................ 45/37923

[52] U.S. Cl.................................... 195/29, 195/30
[51] Int. Cl. ........................ C12d 1/00, C12d 13/06
[58] Field of Search....................................... 195/29

[56] References Cited
UNITED STATES PATENTS
3,623,952   11/1971   Kubota................................. 195/29
3,551,292   12/1970   Kamimura et al.................... 195/29

OTHER PUBLICATIONS

Chemical Abstracts; Vol. 49, No. 9703.

Primary Examiner—Lionel M. Shapiro
Assistant Examiner—Robert J. Warden
Attorney—Meyer A. Gross

[57] ABSTRACT

The present invention relates to a process for synthesizing L-serine. More particularly, the present invention relates to a process for preparing L-serine, which is characterized by condensing glycine and formaldehyde in the presence of threonine-aldolase (E.C. 4.1.2.5) derived from a microorganism.

13 Claims, No Drawings

PROCESS FOR PREPARING L-SERINE

L-serine is one of amino acids constituting proteins. Its importance as a raw material for pharmaceuticals, additives to foodstuffs and cosmetics has increasingly been acknowledged.

Since L-serine is widely distributed in natural protein sources, it conventionally has been prepared by hydrolysing silk yarns, waste cocoons, sericin, etc. which contain a relatively large amount of L-serine. The L-serine is then isolated from other amino acids and subjected to purification. This process has the disadvantages of giving a low yield, and is not economical in view of the limited supply of the raw materials. Other process for the chemical synthesis of L-serine have also been known. However, the thus prepared product has the disadvantage of producing the optically inactive DL-form, to which an optical resolution must be applied to isolate L-serine. These processes are therefore hardly suitable for the commercial preparation of L-serine.

On the other hand, a process is known for preparing L-serine by the use of threonine-aldolase derived from the liver of mammals. This process has, however, the disadvantages of requiring for relatively expensive tetrahydrofolate in addition to glycine and formaldehyde, as well as of a low yield, etc.

It has recently been found that the enzyme threonine-aldolase can be obtained by microorganisms, for example, by using a yeast such as Candida humicola and a bacterium such as Bacterium cadaveris.

It is known that threonine-aldolase enzyme decomposes L-threonine into glycine and acetaldehyde. However, it has now unexpectedly been found that this enzyme when produced by microorganisms can produce L-serine from glycine and formaldehyde without the need for tetrahydrofolate. Further in this reaction, which differs from the case of effecting the enzyme to threonine, the equilibrium of the reaction is remarkably shifted to the synthesis of L-serine so that L-serine can be produced in a high yield by the reaction of glycine and formaldehyde in the presence of this enzyme. According to the present invention, there is no need to use tetrahydrofolate which is conventionally required for the same purpose.

An object of the present invention is to provide a process for preparing L-serine without requiring tetrahydrofolate by using threonine-aldolase derived from a microorganism.

According to the present invention, it is possible to prepare L-serine in an improved manner even in the absence of tetrahydrofolate which was required by the prior art processes.

The threonine-aldolase to be used for the purpose of the present invention is obtained by culturing various microorganisms belonging, for example, to Candida humicola, Candida utilis, Candida rugosa, Bacterium cadaveris, Escherichia coli, Klebsiella pneumoniae, Arthrobacter simplex, Xanthomonas campestris, etc. Preferable microorganisms for the purpose of the present invention are exemplified by Candida humicola 4,584 (ATCC 20,264), Candida humicola 4,586 (ATCC 20,265) Candida utilis (ATCC 20,262), Candida rugosa (ATCC 20,263), Bacterium cadaveris (ATTC 9,760), Escherichia coli E8 (ATCC 21,523), Klebsiella Pneumoniae (ATCC 21,524), Arthrobacter simplex (ATCC 6,946) and Xanthomonas campestris (ATCC 7,381).

All of the above are on deposit at the American Type Culture Collection and are freely available to the public.

The carbon sources, nitrogen sources, inorganic salts and other nutrients conventionally used for the cultivation of the microorganisms may be used for the purpose of the present invention. For example, preferable carbon sources include those which can be metabolized by the microorganisms used in the present process, such as saccharine materials (e.g., glucose, sucrose, molasses, starch hydrolysate), organic acids (e.g., acetic acid) and hydrocarbons. Nitrogen sources include ammonium sulfate, ammonium nitrate, urea, ammonia and other organic nitrogen sources such as corn steep liquor, yeast extract, meat extract, etc. Potassium phosphate, sodium phosphate, magnesium sulfate, etc., can be used as the inorganic salts. Other nutrients such as natural nutrients, vitamins may also be used, if desired.

Potassium and ammonium ion may also be added to the culture medium to increase the enzymatic activity preferably at a concentration of $10^{-2}$ mol. The cultivation is carried out at a temperature of 25° to 37°C, preferably from 28° to 30°C, for 10 – 72 hours under aerobic conditions. The pH of the medium during cultivation is maintained from 7 to 11, preferably at 6.5 in yeast and at 7.0 in bacterium.

The crystalline enzyme preparate obtained from the culturing is yellowish and has maximum absorbances at 420 m$\mu$ and 330 m$\mu$ in addition to at 280 m$\mu$. Moreover, it has been also found that one mol of this enzyme is coupled with 6 mols of pyridoxal phosphate. When the crystalline enzyme is treated with cystein, the absorption spectrum transfers from 420 m$\mu$ to 330 m$\mu$. Further, when the enzyme is treated with ammonium sulfate, an apo-enzyme is resulted. The apo-enzyme is colorless and shows no activity. Its activity can, however, be recovered by addition of pyridoxal phosphate. The Km value of the apo-enzyme to pyridoxal phosphate is $2.5 \times 10^{-7}$ M. Furthermore, the crystalline preparate of this enzyme is uniform when subjected to the disc electrophoresis and is 11.6 S and the diffusion index is $4.06 \times 10^{-7}$ cm$^2$/sec. For this data, a molecular weight of about 277,000 is determined.

Any form of the enzyme threonine-aldolase may be used in the reaction as long as it is derived from microorganism and does not harm the reaction, e.g., together with any of microbial bodies, destroyed microbial bodies, cultured liquor, refined crystal, partially refined product, etc.

According to another feature of the present invention, better results can be obtained by reacting glycine and formaldehyde in a suitable solvent in the presence of threonine-aldolase derived from a microorganism as well as an SH-reagent. The term "SH-reagent" denotes a compound containing a sulfur/hydrogen group, such as for example, mercaptoethanol, dithiothreytol, gluta-thione,2,3-dithioglycerol or mixture thereof. Suitable concentration will vary depending upon the reaction conditions. However, a concentration of about $5 \times 10^{-4}$ to $5 \times 10^{-1}$, especially $10^{-2}$ mol is most preferable.

The process of the present invention is usually carried out in an aqueous solvent preferably having a pH of from 7 to 11, but especially good results can be obtained at a pH of about 8.5. The reaction temperature is from 20°C to 50°C. The higher the temperature, the better the results.

After the completion of the reaction, the reaction product containing L-serine can be treated in conventional manner such as, for example, an ion exchange resin process, etc. to isolate and recover L-serine. The treated material contains L-serine at a high concentration, so that it is possible to obtain a substantial amount of the product easily when compared with the procedure for isolating L-serine from conventional sources.

The use of equal mols of glycine and formaldehyde is preferable in carrying out the reaction of the present invention, but it is not always necessary to be an equal molar quantities. The concentrations of glycine and formaldehyde vary depending upon, for example, the activity of the enzyme to be used. The reaction may proceed without any deteriorative effects when using excess amounts of glycine and formaldehyde. According to the present invention, the reaction is extremely effective at glycine and formaldehyde concentrations of more than 0.1 w/v percent respectively. It is also possible to add with advantage at least one member of the group consisting of pyridoxal phosphate, potassium chloride, etc. to the reaction materials for carrying out the reaction of the present invention.

The following examples illustrate the invention. The microorganisms used in the examples have been deposited at American Type Culture Collection on unrestricted basis and are freely available to the public. All percentages are weight percent based on medium unless indicated otherwise.

EXAMPLE 1

Candida humicola 4,584 (ATCC 20264) was inoculated to a medium (100 ml) having a composition of L-threonine (0.05%), $KH_2PO_4$ (0.2%), $(NH_4)_2SO_4$ (0.1%), $MgSO_4·7H_2O$ (0.1%) and yeast extract (0.5%) for cultivation. The resultant wet cells (0.2g) were added to a solution containing 0.25 ml of 1 mol glycine, 0.25 ml of 1 molar formaldehyde, 0.2 ml of 0.001 mol pyridoxal phosphate solution, 0.20 ml of 1 molar KCl and 1.0 ml of 0.2 molar trisbuffer solution (pH 10). The reaction was carried out at 30°C for 24 hours. The amount of L-serine produced in the reaction mixture was 20 mg.

EXAMPLE 2

A solution containing wet cells (0.2g) obtained from the cultured broths of Arthrobacter simplex (ATCC 6946), from a medium having the composition of Example 1 was added to a solution of 1 mol glycine (0.25 ml), 1 mol formaldehyde (0.25 ml), 0.001 mol solution of pyridoxal phosphate (0.10 ml), 1 mol KCl (0.20 ml) and 0.2 mol tris hydrochloric acid buffer solution (1.0 ml; pH 10). To this solution was added 0.1 mol mercaptoethanol (0.2 ml) and the reaction carried at 30°C. The reaction was completed after 16 hours to produce L-serine (21.4 mg).

A similar reaction to the aforementioned was carried out without addition of mercaptoethanol. The reaction was completed after 24 hours to produce L-serine in an amount of 18.5 mg.

Having described the present invention that which is sought to be protected is set forth in the following claims.

I claim:

1. A process of producing L-Serine not requiring the presence of tetrahydrofolic acid which comprises: (a) forming threonine-aldolase in a culture broth containing a microorganism capable of producing threonine-aldolase and belong to the group consisting of Candida humicola, Candida utilis, Candida rugosa, Bacterium cadaveris, Escherichia coli, Klebsiella pneumoniae, Arthrobacter simplex or Xanthomanos campestris, (b) removing threonine-aldolase from said initial culture broth and thereafter condensing glycine and formaldehyde in the presence of said threonine aldolase.

2. The process of claim 1, in which the condensation reaction is carried out in an aqueous solvent at a pH of 7–11 and at a temperature of 20°–50°C.

3. The process of claim 1, in which the concentration of glycine is more than 0.1 w/v percent.

4. The process of claim 1, in which more than 0.1 w/v percent of formaldehyde is employed.

5. The process of claim 1, in which the reaction is carried out in the further presence of a member of the group consisting of pyridoxal phosphate, potassium chloride and mixtures thereof.

6. The process of claim 1, in which the microorganism is selected from the group consisting of Candida humicola 4584 (ATCC 20264), Candida humicola 4586 (ATCC 20265), Candida utilis (ATCC 20262), Candida rugosa (ATCC 20263), Bacterium cadaveris (ATCC 9760), Escherichia coli E8 (ATCC 21523), Klebsiella pneumoniae (ATCC 21524), Arthrobacter simplex (ATCC 6946), and Xanthomonas campestris (ATCC 7381).

7. The process of claim 1, in which threonine-aldolase is used in a non-refined product containing ingredients of the microbiological step by which it was produced.

8. The process of claim 7, in which the threonine-aldolase is used in the form of microbial bodies.

9. The process of claim 1, in which the condensation is effected in the presence of a compound containing an —SH group.

10. The process of claim 9, in which the SH-reagent is selected from the class consisting of mercaptoethanol, dithiothreitol, glutathione, 2,3-dithioglycerol and mixtures thereof.

11. The process of claim 9, in which the concentration of the SH-reagent is from $5 \times 10^{-4}$ to $5 \times 10^{-1}$ mol.

12. The process of claim 1 wherein said threonine-aldolase is removed as wet cells from culture broth and said wet cells are contacting with glycine and formaldehyde to yield L-Serine.

13. The process of claim 1, wherein culturing is effected in a medium containing as nutrients a carbon source, a nitrogen source and inorganic salts.

* * * * *